United States Patent [19]
Karl et al.

[11] Patent Number: 5,263,362
[45] Date of Patent: Nov. 23, 1993

[54] WELD TEST TOOL

[75] Inventors: Randy L. Karl, Chanhassen; Matthew E. Walsh, Eden Prairie, both of Minn.; Robert M. Adair, Jr., Lucas; Raul (Paul) A. Rios, Royce City, both of Tex.

[73] Assignees: Fluoroware, Inc., Chaska, Minn.; Texas Instruments Incorporated, Dallas, Tex.

[21] Appl. No.: 896,984

[22] Filed: Jun. 10, 1992

[51] Int. Cl.$^5$ ............................................. G01M 3/28
[52] U.S. Cl. .................................................. 73/46; 73/40
[58] Field of Search ............................. 73/46, 40, 49.8

[56] References Cited

U.S. PATENT DOCUMENTS

| | | |
|---|---|---|
| 2,817,230 | 12/1957 | McCully .................................. 73/46 |
| 3,358,497 | 12/1967 | Hauk ..................................... 73/49.1 |
| 4,099,405 | 7/1978 | Hauk et al. .............................. 73/46 |
| 4,194,389 | 3/1980 | Laging ................................... 73/46 |
| 4,513,605 | 4/1985 | Hawerkamp ............................. 73/40 |
| 4,727,749 | 3/1988 | Miller et al. ............................ 73/46 |
| 4,860,796 | 8/1989 | Hagin .................................... 73/49 |
| 4,929,293 | 5/1990 | Osgar ................................... 156/158 |

FOREIGN PATENT DOCUMENTS

| | | | |
|---|---|---|---|
| 1225895 | 9/1966 | Fed. Rep. of Germany | 73/46 |
| 1050021 | 8/1953 | France | 73/46 |
| 94131 | 7/1980 | Japan | 73/46 |
| 202854 | 11/1983 | Japan | 73/46 |
| 124837 | 6/1986 | Japan | 73/40 |
| 2237393 | 5/1991 | United Kingdom | 73/46 |

Primary Examiner—Hezron E. Williams
Attorney, Agent, or Firm—Palmatier, Sjoquist & Helget

[57] ABSTRACT

A pair of semcircular jaws seal against the outer periphery of a pipe adjacent a butt weld joint in the pipe. The jaws have annular pressure rims that apply mechanical pressure against the outer surface of the pipe; and the jaws provide an annular manifold cavity between the pressure rims through which high gas pressure is applied against the joint and adjacent areas of the pipe, all for the purpose of slightly deforming the pipe and opening up any fissure that may exist by reason of an imperfect joint. In a modified form, a cylindrical shroud carries an annulus of balls for supporting against and applying deforming pressure on side portions of the pipe as the shroud is rotated around the pipe.

15 Claims, 4 Drawing Sheets

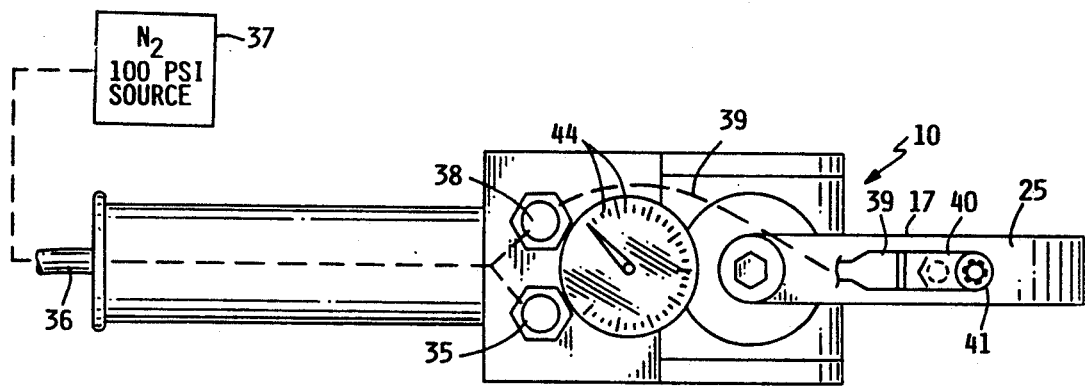
FIG. 3
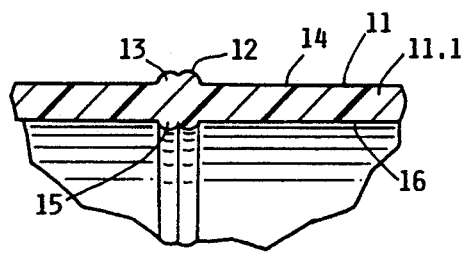
FIG. 4
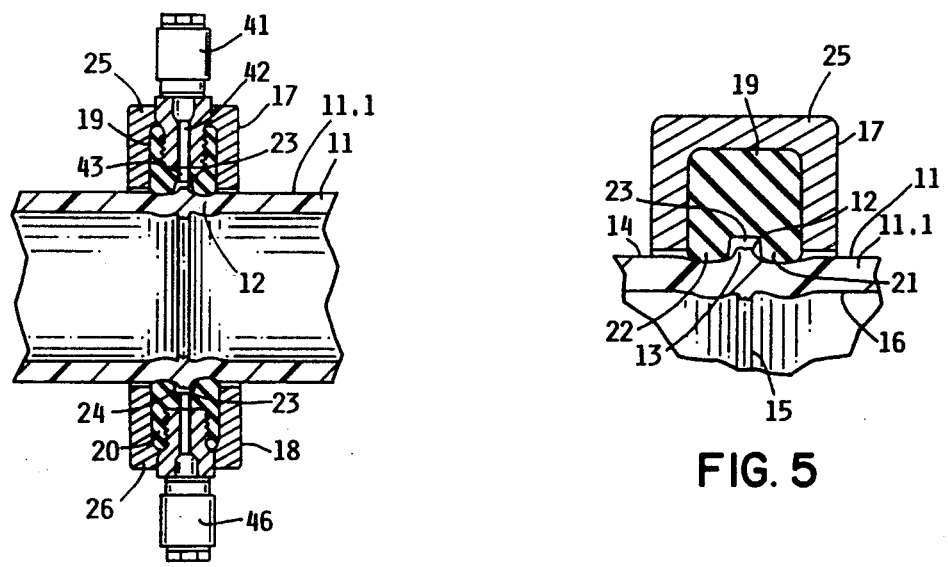
FIG. 6
FIG. 5

WELD TEST TOOL

This invention relates to apparatus for and the method of testing the integrity of welds in a plastic pipe.

BACKGROUND OF THE INVENTION

Plastic pipes, and particularly pipes made of one of the various fluoropolymers, have achieved substantial importance because of their ability to carry highly active chemicals such as acids and bases, and particularly extremely active acids such as hydrofluoric acid, without deteriorating the pipe or allowing leakage. Better than using mechanical joints, fluoropolymer pipes may be butt welded as described in U.S. Pat. No. 4,929,293. Pipes may be welded in a shop, or may be welded in the field during installation.

Because of the uses of such plastic pipes, it is extremely important that the joints be sound and leakproof. Previously, there has not been adequate apparatus or methods for testing the integrity of such weld joints in plastic pipes.

The joints of metal pipes, and particularly high pressure pipelines, have been subject to testing. The U.S. Pat. No. 2,817,230 to McCully shows a device for testing a weld joint in a metal pipe construction line. This cumbersome device requires that a long rubber boot be wrapped around the pipe so that the ends of the boot overlap, and then a pair of semicircular housings are clamped by bolts over the boot and onto the pipe so that high pressure gas may be applied under the boot and against the pipe weld. If the boot and the weld hold the air pressure, it is known that the weld is acceptable. The U.S. Pat. No. 4,099,405 to Hauk shows another form of device for testing a mechanical joint in a pipe.

U.S. Pat. No. 4,513,605 discloses a complicated method and device for testing welds of thermoplastic parts.

Other less pertinent joint testing devices are disclosed in U.S. Pat. Nos. 3,358,497; 4,194,389; 4,727,749; 4,860,796; and 4,879,896.

SUMMARY OF THE INVENTION

An object of the present invention is to provide a new and improved device and method for testing the integrity of butt welds in plastic pipes.

Another object of the invention is to provide an improved apparatus for testing the integrity of welds in plastic pipes, such that the tester may be readily moved about and used in field testing of pipes.

A feature of the invention is a pipe embracing tool with pipe engaging portions which may in one form comprise a pair of semicircular jaws which embrace and seal onto the pipe and welded joint, and seal against each other. The pipe engaging portions surround the pipe and are formed of stiff but resilient material to form an adequate seal onto the pipe. The engaging portions include support portions and pressure applying portions, both formed by rims of the jaw inserts, to support on the pipe and to also apply mechanical pressure onto the pipe adjacent the welded joint to flex the wall of the pipe adjacent the outer surface of the pipe as to open up any fissures that may exist. Means are also provided to apply fluid pressure on the weld joint and in one form, the jaws define an annular manifold cavity adjacent the pressure applying rims. When pressure is applied in the manifold cavity, a rapid loss of pressure will indicate an unsound joint. The application of fluid pressure within the manifold cavity also distorts the pipe inwardly all around the circumference of the pipe adjacent the weld joint and creates a tension on the weld adjacent the inner surface of the pipe as to open any fissures that may exist so that the rapid reduction of air pressure in the manifold will indicate the existence of the imperfections in the welded joint.

Another feature of the invention is such jaws as described, operated by a mechanical device such as an air cylinder or a mechanical linkage, as to uniformly apply the same mechanical pressure onto the jaws in a series of operations so that a multiplicity of welded joints may all be subjected to the same testing for the integrity of the joints.

Another feature of the invention is the provision of an alternate form of pipe embracing tool, with pipe engaging portions in the form of ball bearings in an annular line around the pipe, certain of the balls influenced by a pressure applying device to move certain of the balls inward against the pipe to distort the pipe. This form of tool will revolve around the pipe to distort various portions of the pipe circumference adjacent the bead. To complete the testing, the pipe must be sealed closed and fluid pressure is applied within the pipe.

BRIEF DESCRIPTION OF THE DRAWINGS

FIG. 3 is a top plan view of the testing apparatus.

FIG. 4 is an enlarged detail section view of a welded butt joint between two lengths of plastic pipe.

FIG. 5 is an enlarged detail section view taken approximately at 5—5 in FIG. 2 during a testing operation.

FIG. 6 is an enlarged detail section view taken approximately at 6—6 in FIG. 2.

DETAILED SPECIFICATION

Figure 1:
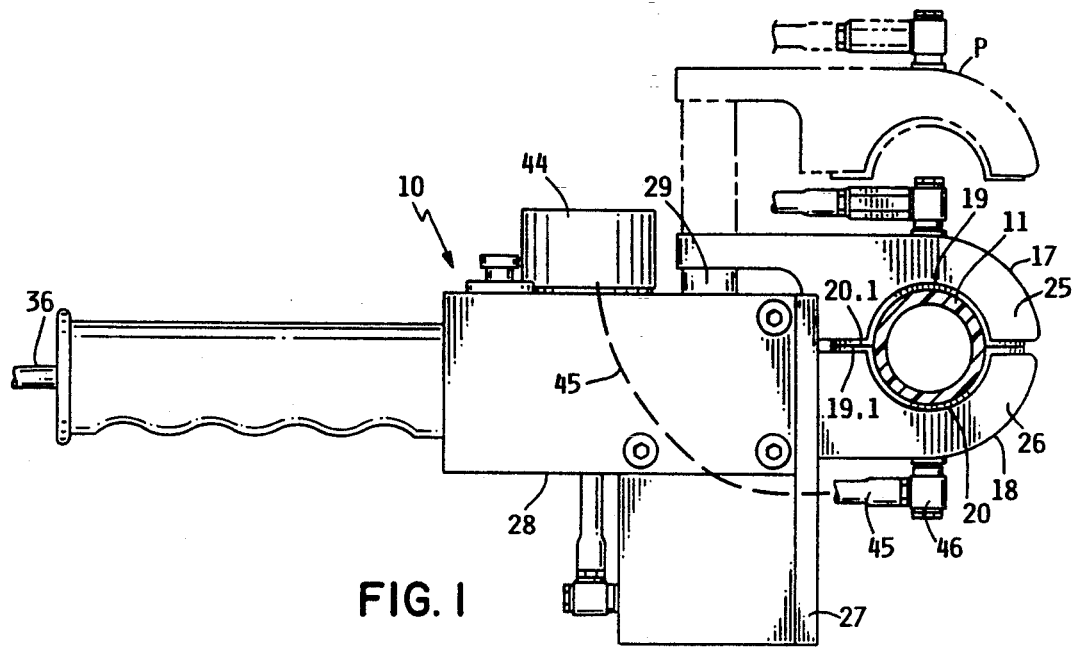
FIG. 1 is an elevation view of the testing apparatus.

The preferred form of apparatus for testing the integrity of a weld joint in plastic pipe is illustrated in FIGS. 1-6 and is a pipe embracing tool indicated in general by numeral 10. The plastic pipe 11 may be made of any of a number of plastics, but a common plastic used in the pipe 11 for carrying highly active chemicals such as acids, is likely to be made of perfluoroalkoxy (PFA), and sold under the trademark Teflon by DuPont. As best seen in FIG. 4, the plastic pipe, after two lengths of the pipe have been fusion welded in a butt joint, is integral and in one piece, and there is no difference in the plastic at the joint 12. In most cases where the butt joint has been formed by fusion welding, an annular bead 13 protrudes slightly from the outer surface 14 of the wall 11.1 of the pipe; and an annular bead 15 also protrudes slightly from the inner wall surface 16 of the pipe.

The purpose of the testing of the joint 12 is to determine whether there may be any imperfections in the joint which would allow leakage of fluids, such as the acids being carried by the pipe when it is put into service. Such imperfections might take the form of minute fissures that only open in response to fluid pressures in the pipe, or weak molecular fused material, or poor bonds.

The testing apparatus or tool 10 comprises pipe engaging portions, which in this form of invention, comprise a pair of semicircular jaws 17 and 18 which are capable of engaging, sealing against, and applying pressure onto the pipe 11 adjacent the joint 12; and also sealing against each other so that gaseous fluid pressure may be applied against the pipe and joint 12.

The jaws 17 and 18 comprise semicircular jaw inserts 19, 20 made of stiff polyurethane which preferably has a slight amount of resilient yieldability so that the jaw insert may seal tightly against the outer wall of the pipe and may also seal against each other. Of course, the inserts may be made of other stiff but resiliently yieldable material capable of deforming the pipe wall and simultaneously sealing against the pipe.

Figure 2:
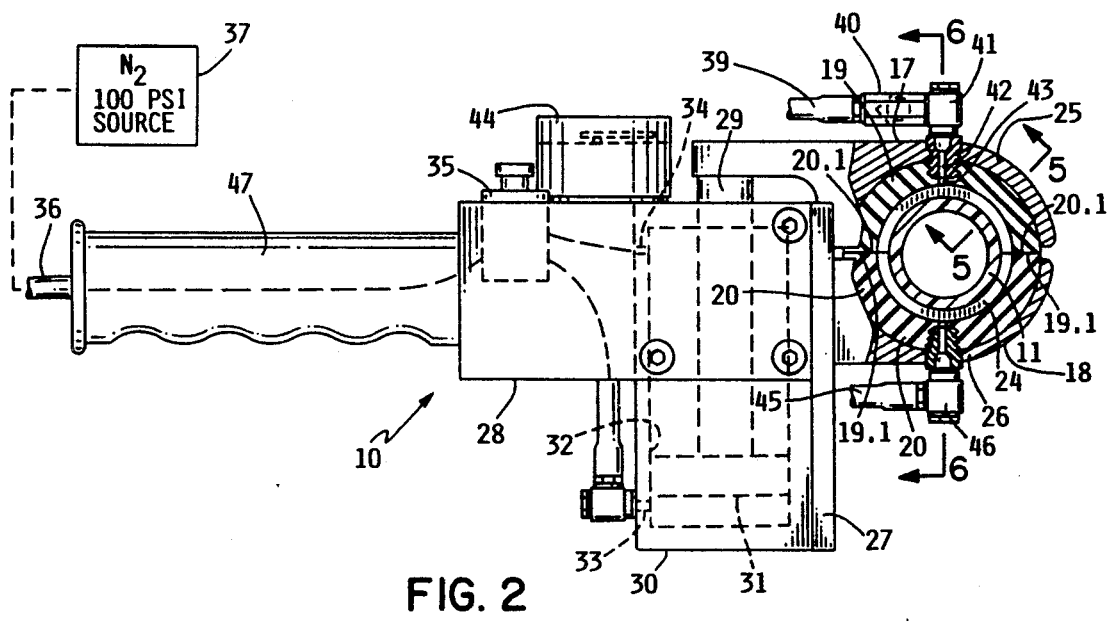
FIG. 2 is an elevation view of the testing apparatus and with portions thereof broken away and shown in section.

The semicircular jaw inserts 19, 20 have flat end faces 19.1, 20.1, which engage and seal against each other when the jaws 17 and 18 are in closed position as illustrated in FIGS. 1 and 2 in their full-line position. The jaw 17 is movable to an alternate or open position indicated by the letter P in FIG. 1, so as to release the pipe and allow the apparatus 10 to be removed from the pipe.

Each of the jaw inserts 19, 20 also has a pair of arcuate and semicircular rim portions 21 and 22 which are both supporting portions and pressure applying portions at opposite sides of the pipe, and each of the rim portions acting to support against one side of the pipe while the opposite rim portion on the other jaw applies pressure against the pipe for deforming the pipe. The rim portions 21, 22 extend semicircularly to the ends of the inserts 19 and 20 and which are spaced apart as to define arcuate and semicircular manifold cavities 23 therebetween. In one form, the one inch pipe 11 may have an outside diameter of 1.315 inch; and the preferable jaw inserts 19, 20 define an inside diameter of 1.250 inch at the pipe engaging faces of the rims 21, 22. Other removable inserts 19, 20 with other dimensions may be substituted for use with other sizes of pipes, which may be up to 4 inches or more internal diameter, and correspondingly more at the outside of the pipe. When the jaws 17 and 18 are in closed position as illustrated in FIGS. 1 and 2, so that the end faces 19.1, 20.1 of the jaw inserts are sealed against each other, the semicircular manifold cavities 23 of the two jaws are in fluid flow communication with each other and cooperate in defining a single annular manifold cavity 24 seen in FIG. 2 which confines the entire bead 13 of the joint 12.

Each of the jaws 17 and 18 also comprise a rigid metal shroud or jaw housing 25 and 26. Shrouds 25, 26 extend substantially semicircularly along inserts 19, 20 and shrouds 25, 26 are U-shaped, as seen in FIG. 5, to embrace the inserts 19, 20. The shrouds do not engage each other when the jaws are closed onto a pipe. The jaw housing 26 of the lower jaw 18 is affixed to a rigid mounting plate 27 which is a part of the frame structure 28.

Means are provided for opening and closing the jaws 17 and 18. Such means comprise a fluid motor 30 and its ports, and valve 35 and nitrogen gas source 37. The jaw housing 25, which is movable to position P as illustrated in FIG. 1, is affixed to the end of a piston rod 29 which is a part of a pneumatic or fluid motor 30, which also includes a piston 31 which reciprocates within a cylinder 32 of the motor 30. The fluid motor 30 is double acting so that gas pressure supplied into the fluid motor will move the piston 31 and its piston rod 29 both upwardly and downwardly as the movable jaw 17 is moved to open and closed positions.

Gas ports 33 and 34 adjacent opposite ends of the cylinder 32 are connected through a nitrogen control and exhaust valve 35 to a pressurized nitrogen supply line 36 from nitrogen source 37 for controlling the operation of the piston 31 and of the movable jaw 17. Valve 35 is a three way valve allowing gas to be continuously supplied to port 34 when in the normally up position. This pressure keeps the piston rod 29 in the down position and jaw 17 closed. When the valve button "B" is depressed the valve 35 turns off gas to port 34 and sends gas to port 34. This moves the piston rod 29 upward and opens jaw 17. When the button "B" is released, the piston rod 29 moves downward and jaw 17 returns to the normally closed position.

Means are also provided for applying and sensing fluid pressure on the weld to detect any fluid leakage through the weld joint. In this form, gas pressure is applied through the annular manifold cavity 24 onto the outside of the bead 13 and joint 12. Such means includes the gas source 37, valve 40, manifold cavity 24, and gauge 44.

The source of high pressure nitrogen gas 37 is also available and used as the fluid under pressure for testing the integrity of the joint 12 and for this purpose, the source of nitrogen preferably has an approximate pressure of 100 psi. The nitrogen source is connected through supply line 36 to a control valve 38 on the frame structure 28 and through a flexible tube or hose 39 to a check valve 40 which allows flow of the nitrogen gas only toward the jaw 17. The check valve 40 is connected to a fitting 41 which is threaded into the jaw housing 25. The fitting 41 also extends into the jaw insert 19 of the upper jaw 17 so that the nitrogen gas is supplied through the aligned ports 42 in the fitting 41 and the port 43 in the insert 19. Accordingly, when the valve 38 is operated, high pressure nitrogen gas is supplied through check valve 40 into the annular manifold cavity 24 so as to subject the entire circumference of the pipe 11 and joint 12 to the high gaseous pressure.

Pressure level in the annular manifold cavity 24 is sensed and displayed by a gas pressure gauge 44 on the frame 28. The pressure gauge 44 is connected by a hose or a tube 45 and a fitting 46 into and through the lower jaw insert 20 and to the annular manifold cavity 24 thereof. Accordingly, the gas pressure that exists in the annular manifold cavity 24 will be displayed by the pressure gauge 44. Pressure gauge 44 may be replaced by other pressure indicators and transducers, or a mechanical indicator. For instance, the indicator may simply have alternately illuminated green and red lights to indicate maintenance of satisfactory and unsatisfactory pressure levels in the cavity 24. Of course, a digital readout of pressure levels may also be utilized.

The frame 28 of the apparatus carries a handle 47 so that the testing apparatus 10 may be readily and easily manually manipulated.

When a joint 12 of a plastic pipe 11 is to be tested for soundness, the testing apparatus is operated by pressure button "B" and operating valve 35 to cause motor 30 to lift and open jaw 17. The jaws are placed onto the pipe in the manner illustrated so that initially the two semicircular manifold cavities 23 are aligned with an adjacent portion of the joint bead 13 so that the cavities 23 will receive the bead as the jaws are closed onto each other. The lower jaw 18 will be placed against the pipe 11 and then the operating valve 35 will be released to cause the fluid motor 30 to operate, for moving the upper jaw 17 downwardly with pressure onto the pipe, so that the bead 12 is received into the insert cavity 23 of the jaw 17. In this condition, the manifold cavity then becomes annular and is designated by the numeral 24 in FIG. 2. When the jaw 17 is seated against the periphery of the pipe 11, substantial mechanical pressure is applied by the rims 21, 22 against the outer surface of the pipe adjacent the joint 12. The portions of the pipe 11 underneath the rims 21, 22 are flexed inwardly, substantially as illustrated in FIGS. 5 and 6, (flexing is exaggerated in FIGS. 5 and 6 in order to be illustrated) with the effect that the joint 12 of the pipe in the vicinity of the outer bead 13 and outer surface 14, is put under stress or tension and any fissures that may exist, caused by imperfections in the weld, will open up and will leak fluid pressure when pressure is applied from the nitrogen source 37. When the jaws have been tightly applied onto the pipe, the end portions 19.1, 20.1 of the inserts 19, 20 also seal against each other so that the annular manifold cavity 24 is completely closed and leakage through the jaws, or at their end portions, is prevented.

The nitrogen gas is applied into the manifold cavity 24 by operating valve 38, and of course, the flow of gas will pass the check valve 40 so that the full pressure of the approximate 100 psi nitrogen source is applied into the annular manifold cavity 24. As the gas pressure is elevated in the annular manifold cavity, the gas pressure bears against the outer surface 14 of the pipe in the space between the pressure applying rims 21, 22 and against the outer surface of the bead 13 so that the gas pressure tends to slightly deform the entire region of the joint 12, and around the entire circumference thereof, and cause slight inward deformation of the whole area of the pipe adjacent the joint 12 and between the rim 21, 22. As a result of this slight inward deformation of the pipe due to the gas pressure in the manifold cavity 24, the wall 11.1 of the pipe 11 and the inner bead 15 is put under stress or tension adjacent bead 15 and inner surface 16, and any fissures or weak molecular fused material or poor bonds that may exist in the joint 12 in the vicinity of the bead 15 and adjacent the inner surface 16 of the pipe that may exist by reason of the imperfections in the joint will open.

After the full pressure of the nitrogen source has been applied into the annular manifold cavity 24, the nitrogen source 37 is disconnected from the manifold cavity 24, as by closing of the valve 35.1, and the check valve 40 will close and hold the gas pressure in the annular manifold cavity 24.

In the event that there is any leakage through fissures in the joint 12, the gas pressure read on the pressure gauge 44 will reduce in a matter of a few seconds because of the pressure being applied by the pressure rims 21, 22 and by the gas in the manifold cavity 24, which tends to open up any fissures that may exist. If the gauge 44 indicates continued pressure without loss, then the joint is acceptable.

The tool 10 may then be removed from the pipe by operating valve 35, which will reverse the air connections to the cylinder and extend piston 31 and rod 29 to open jaw 17.

According to the operation of the apparatus illustrated in FIGS. 1-6, the method of testing the integrity of a weld joint in plastic pipe is understood to include the steps of applying mechanical pressure onto the outer surface of the plastic pipe at opposite sides of the weld joint and between the pressure rims 21, 22 and substantially around the entire circumference of the pipe and the joint 12 within the annular manifold cavity 24 so that deflection of the pipe will occur under the mechanical pressure applied by the rim; and simultaneously with applying said mechanical pressure, gas pressure is also applied against the entire circumference of the outer surface of the pipe in the space between the pressure rims 21, 22 and in the manifold cavity 24 so that the gas pressure is applied across the entire widths of the joint area adjacent portions of the pipe, causing the circumferential wall 11.1 of the pipe to deflect slightly inwardly causing any fissures that may exist adjacent the inner bead and the inner face of the pipe wall 11.1 to open.

Figure 7:
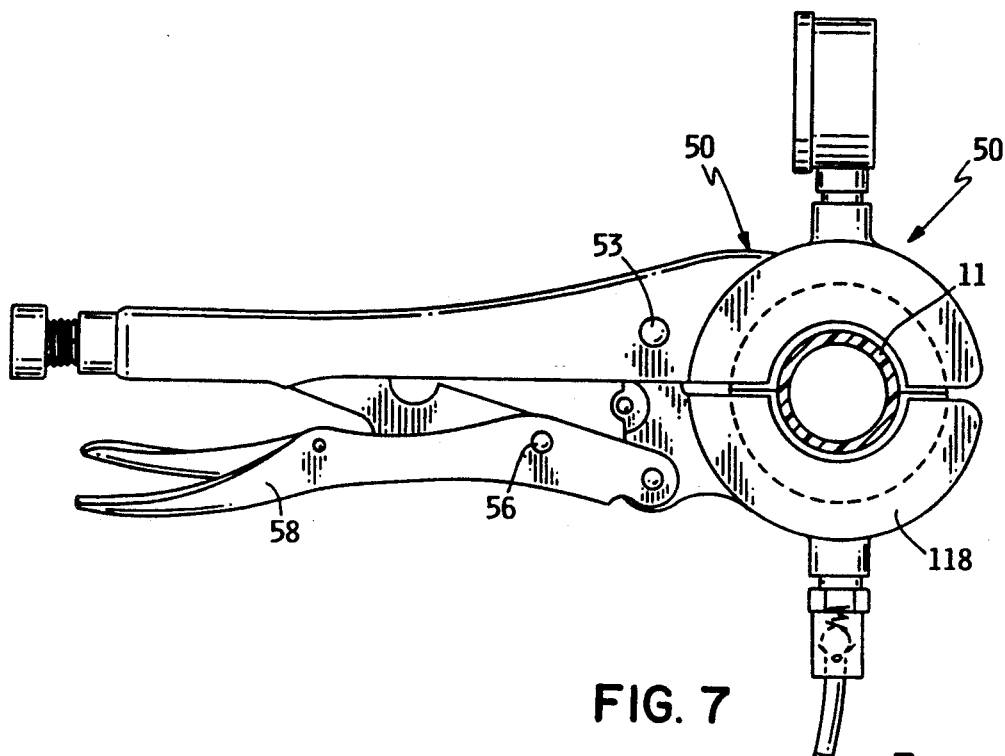
FIG. 7 is an elevation view of an alternate embodiment of the testing device.
Figure 8:
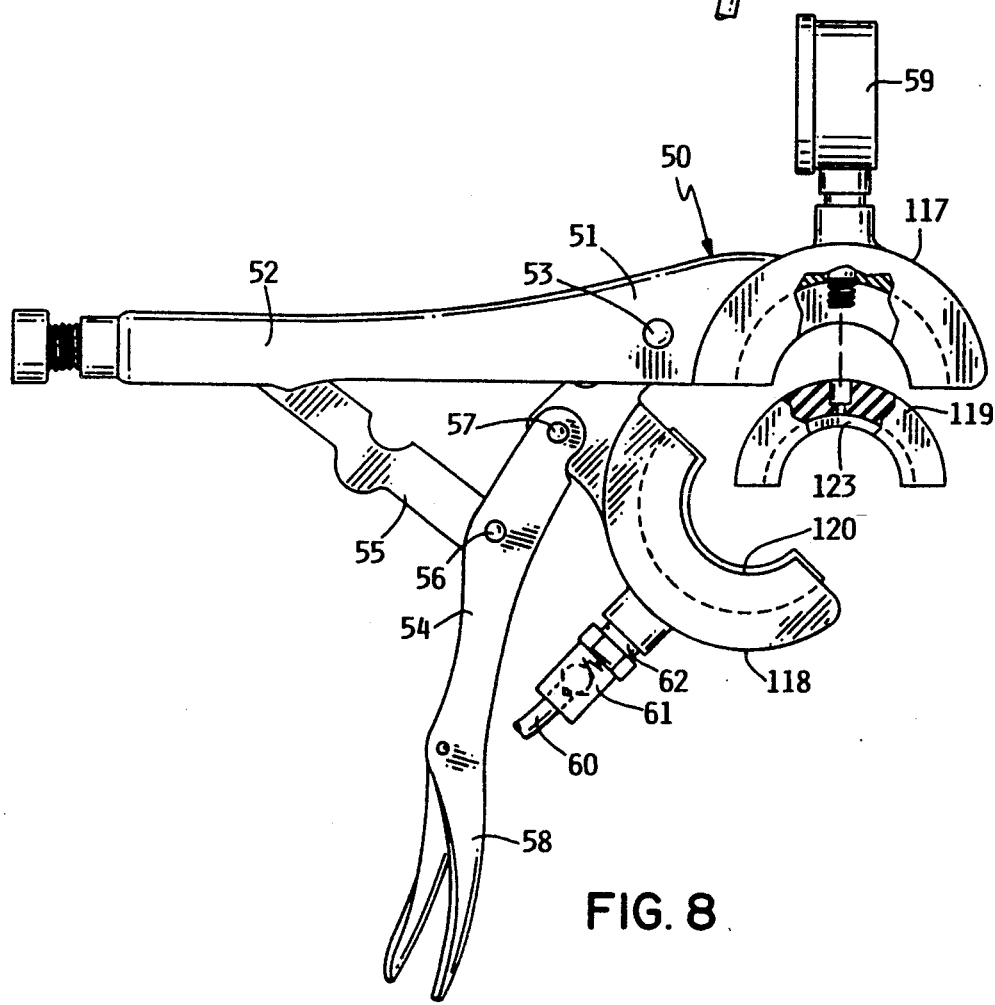
FIG. 8 is an elevation view of the apparatus of FIG. 7 showing the apparatus in open condition and partly disassembled for clarity and understanding of detail.

In the form illustrated in FIGS. 7 and 8, the jaws 117 and 118 are substantially identical to the jaws 17 and 18 of the FIGS. 1-6 and include the identical jaw inserts 119 and 120. The jaw inserts have the same semicircular arcuate manifold cavities 123 through which gas pressure is applied onto the joint as previously described. In this form of apparatus 50 in FIGS. 7 and 8, the jaw 117 is affixed or formed integrally of a frame member 51 which also forms a handle 52. The jaw 118 is connected to the frame 51 by a pivot 53 so as to allow the jaw 118 to swing toward and away from the stationary jaw 117 for opening and closing the jaws relative to the pipe 11. A linkage 54, 55 and pivots 56, 57 connecting the linkage together and to the jaw 118, are operable to swing the jaw 118 into open and closed position. A portion of the linkage at 58 also forms an operating handle for the linkage.

The pressure gauge 59 is affixed onto the jaw 117 and connected into the manifold cavity 123 for sensing the gas pressure therein with is displayed by the gauge 59. High pressure nitrogen gas is supplied to the lower jaw through a hose tube 60 through a check valve 61 and fitting 62 so that the high pressure nitrogen gas is supplied into the manifold cavity substantially is described in connected with FIGS. 1-6.

Although the jaws of the testing apparatus illustrated herein are semicircular in shape, it should be understood that in other modified mechanical arrangements, other shapes of arcuate jaws might be utilized, such as an arrangement where three or four jaws, instead of only two, are used to emcompass the circumference of the pipe. Such arcuate jaws would operate substantially the same of these semcircular jaws.

It will be seen that a testing apparatus and method provides applying mechanical and gaseous pressure around the entire periphery of a pipe adjacent the joint as to deform the plastic wall and joint to open up any fissures or weak molecular fused material or poor bonds that may exist so that they may be detected by leakage of gas pressure applied to the outer surface of the pipe.

Figure 9:
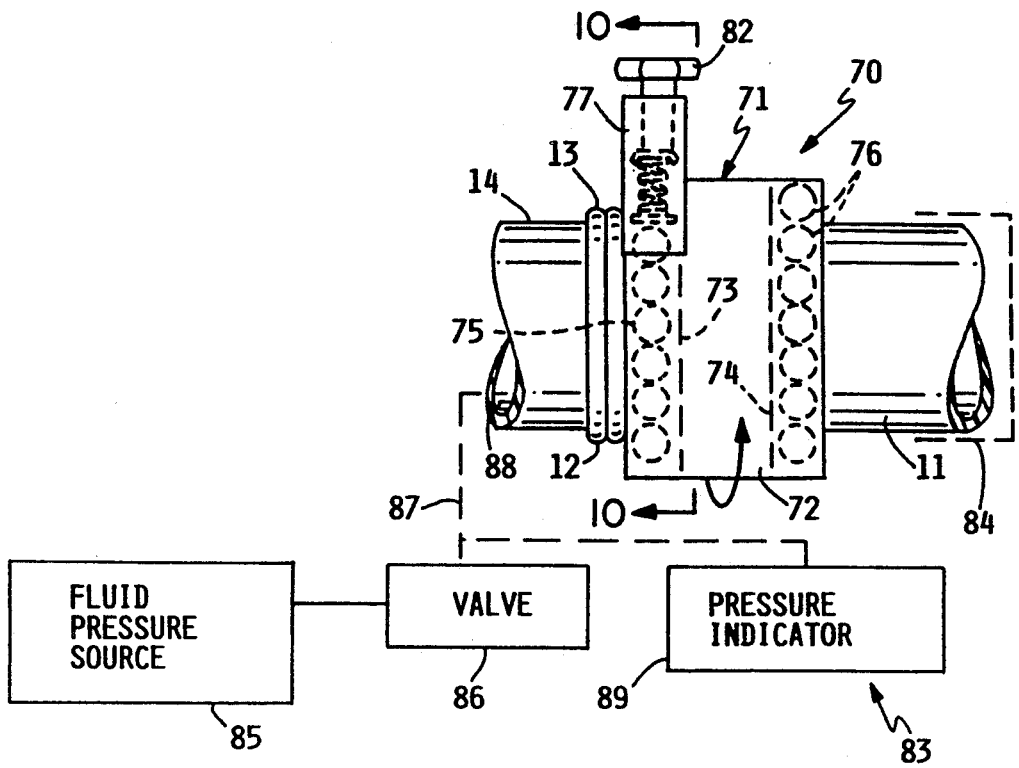
FIG. 9 is an elevation view of a modified form of tool for embracing and deforming the pipe.
Figure 10:
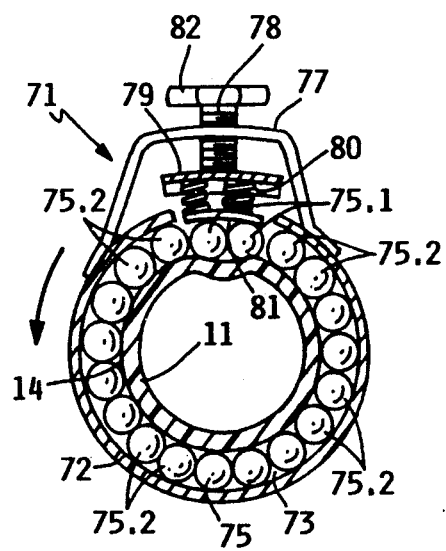
FIG. 10 is a detail section view taken approximately at 10—10 in FIG. 9.

In the form of the invention illustrated in FIGS. 9 and 10, the weld joint testing apparatus is indicated in general by numeral 70 and the pipe embracing tool is indicated in general by the numeral 71. The pipe embracing tool 71 is applied onto the pipe 11 adjacent the weld joint 12 so that one side of the tool is located immediately adjacent the bead formed at the outer surface 14 of the pipe.

The pipe embracing tool comprises a generally cylindrical metal shroud 72 which defines a pair of raceways 73, 74 adjacent opposite ends of the shroud. The tool 71 is provided with engaging portions or ball bearings 75 in the raceway 73 and arranged substantially along an annular line within the shroud 72 to engage the outer surface 14 of the pipe within a narrow band immediately adjacent the weld joint 12 and bead 13. It will be recognized that the engaging portion of balls 75 have an internal diameter which is substantially the same as the outer diameter of the pipe 11. A second guiding annulus of ball bearings 76 is provided in the raceway 74 and within the metal shroud 72 to provide a guiding function and to roll around the outer surface 14 of the pipe. The annulus of bearings 76 has an internal diameter approximately the same as the outer diameter of the outer surface 14 of the pipe 11 so as to roll smoothly therearound.

The engaging portions or balls 75 of the embracing tool 71 also define a pressure applying portion embodied by a pair of balls 75.1; and the engaging portions or balls 75 also define a support portion comprising the remainder of the balls 75.2 in the raceway 73. The pressure applying portion or balls 75.1 are recognized in FIG. 10 to be displaced slightly inwardly relative to the supporting portion or balls 75.2 so as to slightly deform the pipe wall as illustrated in FIG. 10. A part of the pressure applying portion of the tool 71 is a rigid frame bridge 77 affixed as by welding at its opposite ends to the shroud 72. A threaded rod 78 is threaded into a tapped aperture of the bridge 77 and bears against a pressure plate 79 which carries springs 80, the lower ends of which mount a bearing plate 81 which engages and applies inward pressure against the balls 75.1 for displacing them inwardly.

The threaded rod 78 has a handle 82 on its outer end for adjusting the location of the rod 78 and pressure plate 79 for increasing or decreasing the pressure on the balls 75.1, thereby controlling the degree of inward displacement of the balls 75.1 relative to the position of the supporting portion and balls 75.2.

The testing apparatus 70 of FIGS. 9 and 10 also includes means 83 for applying and sensing fluid pressure onto the pipe 11 and joint 12 to detect fluid leakage through the weld joint, and in the form illustrated, such means includes a cap 84 sealed onto the end of the pipe 11, a source of fluid pressure 85 connected through a valve 86 by a hose 87 into the closed interior 88 of the pipe 11. A pressure indicator 89 is connected into the duct 87 to sense and display the pressure condition within the pipe. When the apparatus 70 is to be used to test the integrity of the weld joint 12, the pipe embracing tool 71 is slipped onto the end of the pipe 11 and along its length to the weld joint 12, into the position substantially as illustrated in FIG. 9. The cap 84 is applied to one end of the pipe to seal the pipe; and the duct 87 is connected to the other closed end of the pipe in a sealed joint so that the interior 88 of the pipe may be pressurized. The fluid pressure source is activated and valve 86 is opened to apply the fluid pressure, such as nitrogen, under approximately 100 psi, and the pressure will be indicated at the indicator 89. The tool 71 is then adjusted by turning the handle 82 to slightly displace the pressure applying portion or balls 75.1 inwardly to slightly deform the pipe adjacent the weld joint 12. The tool 71 will be rotated around the pipe 11 so that the pipe will be progressively deformed all around its circumference by the pressure applying portion or balls 75.1. The pressure indicator will be observed so that any loss in pressure during the test will be noted, thus indicating a possible leak in the pipe joint 12. Of course, if the pressure at the indicator 89 is maintained substantially constant throughout the test, then it may be concluded that the weld joint 12 is sound and has the necessary operational integrity.

The present invention may be embodied in other specific forms without departing from the spirit or essential attributes thereof, and it is therefore desired that the present embodiment be considered in all respects as illustrate and not restrictive, reference being made to the appended claims rather than to the foregoing description to indicate the scope of the invention.

We claim:

1. Apparatus for testing the integrity of a weld joint in plastic pipe, comprising a plurality of arcuate jaw portions adjacent each other to embrace and seal against such pipe, each of the jaw portions having end portions engaging and sealing against other adjacent end portions, each of the jaw portions comprising inner peripheral portions defining a pair of arcuate pressure applying rim portions sealing against the pipe and spaced from each other to define an arcuate manifold cavity therebetween, the jaw portions sealing against each other and against the pipe to connect the arcuate manifold cavities together into a continuous annular manifold cavity confronting the weld joint at the outer surface of the pipe to apply fluid pressure against the pipe and weld joint as the rim portions apply mechanical pressure onto the pipe at opposite sides of the weld joint, means mounting and moving the jaw portions toward and away from each other and toward and against the pipe and applying deforming force against the pipe through the pressure applying rim portions, and means applying and sensing fluid pressure in the continuous annular manifold cavity.

2. A testing apparatus according to claim 1 wherein said plurality of jaw portions comprise a pair of arcuate and substantially semicircular jaw portions.

3. A testing apparatus according to claim 1 wherein said spaced rim portions are formed integrally with each other and in one piece to confine the arcuate manifold cavity against leakage.

4. A testing apparatus according to claim 1 wherein the means mounting and moving the jaw comprises a fluid motor having a cylinder portion connected to one jaw and a piston portion connected to the other jaw.

5. A testing apparatus according to claim 1 wherein the means applying and sensing fluid pressure comprises a check valve preventing reverse fluid flow out of the annular fluid manifold cavity.

6. A testing apparatus according to claim 1 wherein the means applying and sensing fluid pressure comprises a fluid pressure indicating means.

7. A testing apparatus according to claim 1 wherein the means applying and sensing fluid pressure comprises a source of gas pressure.

8. A testing apparatus according to claim 1 wherein each of said jaw portions comprises a stiff and resilient yieldable portion engaging and sealing against the pipe and adjacent the jaw portion, and each of said jaw portions also comprising a rigid and arcuate shroud embracing and confining said stiff and resiliently yieldable portion.

9. A testing apparatus according to claim 1 wherein the means mounting and moving the jaw portions also comprises a handle portion for manipulating the jaw portion onto and away from the pipe.

10. A testing apparatus according to claim 1 wherein said means mounting and moving the jaw portions comprises pivot means mounting said jaw portions for relative swinging movement, and operating linkage means producing relative swinging of the jaws toward and away from each other.

11. A method of testing the integrity of a weld joint in plastic pipe, comprising applying mechanical pressure onto the outer surface of the plastic pipe at opposite sides of the weld joint and around substantially the entire circumference of the pipe and in a direction toward the inside of the pipe to inwardly deflect the plastic pipe adjacent opposite sides of the weld joint to stress the pipe and weld joint adjacent the outer surface of the pipe and open existing fissures, and simultaneously with said applying mechanical pressure also applying gas pressure against the entire circumference of the outer surface of the pipe and weld joint and across the entire portions of the pipe between the locations at which mechanical pressure is applied to additionally deflect the pipe and weld joint to open existing fissures or weakened bond in the weld joint.

12. The method of testing according to claim 11 and also comprising continuing the application of said gas pressure while sensing the magnitude of the gas pressure at the circumference of the pipe to determine any loss of air pressure due to leakage through such fissures.

13. Apparatus for testing the integrity of a weld joint in plastic pipe, comprising a pipe embracing tool to be applied to the outside of such a pipe, the tool comprising engaging portions arranged substantially along an annular line to engage the pipe within a narrow band adjacent the weld joint, said engaging portions comprising a support portion extending around a first side portion of the pipe and said engaging portions also comprising a pressure applying portion opposite the support portion to engage and apply pressure upon a second side portion of the pipe opposite to said first side portion for deforming said second side portion of the pipe adjacent to the weld joint, and means applying and sensing fluid pressure onto the pipe to detect any fluid leakage through the weld joint after the pipe is deformed.

14. Testing apparatus according to claim 13 wherein the engaging portions comprise cooperating arcuate jaws embracing the pipe, and said support portion and pressure applying portion comprise arcuate rim portions of said jaws to bear against first and second side portions of the pipe and to deform the second side portion of the pipe adjacent to the weld joint, and means for producing relative opening and closing movement of the jaws for applying to the pipe and removing the tool from the pipe.

15. Testing apparatus according to claim 13 wherein said engaging portions comprise a multiplicity of balls arranged in an annulus, said supporting portion comprising means mounting the balls for engaging and rolling on said first side portion of the pipe, the pressure applying portion comprising one of said balls and a mounting for said one ball displacing said one ball inwardly of the annulus to apply localized inward pressure on said second side portion of the pipe.

* * * * *